United States Patent
Sights et al.

(10) Patent No.: US 9,454,153 B2
(45) Date of Patent: Sep. 27, 2016

(54) FARM VEHICLE AUTOPILOT WITH AUTOMATIC CALIBRATION, TUNING AND DIAGNOSTICS

(71) Applicants: Brandon M Sights, Highlands Ranch, CO (US); John W Peake, Mountain View, CA (US)

(72) Inventors: Brandon M Sights, Highlands Ranch, CO (US); John W Peake, Mountain View, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 73 days.

(21) Appl. No.: 14/551,447

(22) Filed: Nov. 24, 2014

(65) Prior Publication Data

US 2016/0147225 A1    May 26, 2016

(51) Int. Cl.
| | |
|---|---|
| G05D 1/00 | (2006.01) |
| A01B 69/00 | (2006.01) |
| G01S 19/13 | (2010.01) |
| G05D 1/02 | (2006.01) |
| A01B 69/04 | (2006.01) |

(52) U.S. Cl.
CPC ............. *G05D 1/0088* (2013.01); *A01B 69/00* (2013.01); *G01S 19/13* (2013.01); *G05D 1/0221* (2013.01); *G05D 1/0278* (2013.01); *A01B 69/008* (2013.01)

(58) Field of Classification Search
CPC ................... G05D 1/0221; G05D 2201/0201; G01C 21/165
See application file for complete search history.

(56) References Cited

U.S. PATENT DOCUMENTS

| | | | |
|---|---|---|---|
| 5,334,987 | A | 8/1994 | Teach |
| 5,928,309 | A | 7/1999 | Korver |
| 5,987,383 | A | 11/1999 | Keller |
| 6,087,984 | A | 7/2000 | Keller |
| 6,104,339 | A | 8/2000 | Nichols |
| 6,198,992 | B1 | 3/2001 | Winslow |
| 6,314,348 | B1 | 11/2001 | Winslow |
| 6,353,409 | B1 | 3/2002 | Keller |
| 6,356,819 | B1 | 3/2002 | Winslow |
| 6,377,889 | B1 | 4/2002 | Soest |
| 6,424,295 | B1 | 7/2002 | Lange |
| 6,463,374 | B1 | 10/2002 | Keller |
| 6,501,422 | B1 | 12/2002 | Nichols |
| 6,549,849 | B2 | 4/2003 | Lange |
| 6,609,065 | B1 | 8/2003 | Lange |
| 6,686,878 | B1 | 2/2004 | Lange |
| 6,804,587 | B1 | 10/2004 | O'Connor |
| 7,054,731 | B1 | 5/2006 | Lange |
| 7,065,440 | B2 | 6/2006 | Aral |

(Continued)

FOREIGN PATENT DOCUMENTS

| | | |
|---|---|---|
| WO | 2010004383 A2 | 1/2010 |
| WO | 2012078535 A1 | 6/2012 |

OTHER PUBLICATIONS

Topcon Precision Agriculture, System 350, X30 Console, Operator's Manual, Chapter 7, Aug. 2012.

(Continued)

*Primary Examiner* — Todd Melton
(74) *Attorney, Agent, or Firm* — NUPAT, LLC; Morrison Ulman

(57) ABSTRACT

Automatic calibration, tuning and diagnostics improve precision farming by helping farmers obtain best performance from their autopilot-guided vehicles. Automatic calibration procedures that cannot be accurately performed by human drivers, automatic autopilot tuning, and simplified diagnostics are all parts of an advanced farm vehicle autopilot system.

16 Claims, 9 Drawing Sheets

(56) References Cited

U.S. PATENT DOCUMENTS

| | | | |
|---|---|---|---|
| 7,156,328 | B2 | 1/2007 | Samaha |
| 7,188,015 | B2 | 3/2007 | Lange |
| 7,200,490 | B2 | 4/2007 | Lange |
| 7,225,060 | B2 | 5/2007 | O'Connor |
| 7,363,132 | B2 | 4/2008 | Lange |
| 7,363,154 | B2 | 4/2008 | Lindores |
| 7,383,114 | B1 | 6/2008 | Lange |
| 7,715,979 | B2 | 5/2010 | Dix |
| 7,729,853 | B2 | 6/2010 | Price |
| 7,844,378 | B2 | 11/2010 | Lange |
| 7,860,628 | B2 | 12/2010 | Lange |
| 8,244,434 | B2 * | 8/2012 | Matthews ............... B62D 6/002 701/42 |
| 8,577,537 | B2 | 11/2013 | Matthews |
| 8,583,312 | B2 | 11/2013 | Schreiber |
| 8,626,441 | B2 | 1/2014 | Matthews |
| 8,694,382 | B2 * | 4/2014 | Aznavorian ........... G05D 1/021 250/307 |
| 2007/0005202 | A1 | 1/2007 | Breed |
| 2008/0275602 | A1 | 11/2008 | Peake |
| 2008/0294309 | A1 * | 11/2008 | Kaprielian ........... A01B 69/008 701/27 |
| 2009/0118904 | A1 | 5/2009 | Birnie |
| 2011/0231061 | A1 | 9/2011 | Reeve |
| 2013/0054074 | A1 | 2/2013 | Schreiber |

OTHER PUBLICATIONS

International Search Report and Written Opinion of the International Searching Authority in PCT/US2015/060949, May 20, 2016.

* cited by examiner

FARM VEHICLE AUTOPILOT WITH AUTOMATIC CALIBRATION, TUNING AND DIAGNOSTICS

TECHNICAL FIELD

The disclosure is related to agricultural autopilot systems.

BACKGROUND

Precise vehicle control is part of the foundation of modern precision farming. Autopilots for tractors, sprayers, combines, windrowers, and other farm vehicles, drive more accurately than any human can. Autopilots reduce operator fatigue and improve safety. They help farmers use chemicals such as fertilizers and pesticides as efficiently as possible and save money and the environment. The wide variety of vehicles outfitted with farm autopilot systems, and the wide variety of tasks that those vehicles perform under autopilot control, are a blessing for the farmer, but a curse for the autopilot designer who must make systems that work with each vehicle.

Thousands of different tractors types exist, for example, along with hundreds of different types of steering sensors and dozens of different types of steering actuators. Almost always, two vehicles of different make and model have different performance characteristics, and sometimes even two vehicles of the same make and model perform quite differently, due to custom modifications, different vehicle tasks, component failures, installation errors, vehicle age and wear, or myriad other factors. Whatever the particular circumstances, an autopilot should be tuned for the particular job it is asked to do. Incorrectly set-up autopilots lead to operator frustration and deprive farmers of the maximum benefits of their equipment.

Conventional, manual methods for autopilot tuning are fraught with trouble. Operator error when attempting to follow calibration and tuning procedures is common. Modern farm vehicle autopilots have dozens of adjustable parameters. It is difficult, even for an expert, to look at a set of autopilot parameters and determine whether or not the autopilot is correctly configured for a given vehicle. Thus, many autopilot-guided farm vehicles do not perform as well as they could.

What are needed are farm vehicle autopilots that can be easily and accurately tuned for a wide variety of vehicles and that provide an indication to operators to let them know what level of performance may be expected when their vehicle is under autopilot control.

SUMMARY

Systems described herein include a farm vehicle autopilot comprising a global navigational satellite system (GNSS) sensor and an inertial measurement unit (IMU) sensor in communication with a microprocessor and memory, wherein the microprocessor and memory are configured to: (1) receive steering angle data from a steering angle sensor, (2) send steering angle commands to a steering angle actuator, and (3) perform automatic autopilot calibration by guiding a farm vehicle through a calibration maneuver and measuring vehicle response characteristics during the calibration maneuver with the GNSS and IMU sensors.

In some embodiments the microprocessor and memory are further configured to: (4) perform automatic tuning of autopilot settings.

In some embodiments the microprocessor and memory are further configured to: (4) perform automatic diagnostics of vehicle performance under autopilot control.

In some embodiments the automatic diagnostics include computing a performance grade to summarize calibration and/or tuning data.

In some embodiments the automatic diagnostics include reporting vehicle component abnormalities.

In some embodiments the automatic diagnostics are based on a fuzzy logic reasoner comprising degree-of-membership functions and fuzzy associative memory rules.

In some embodiments the automatic diagnostics are based on performance grading rules including weighted sums of vehicle characteristic data.

In some embodiments a farm vehicle autopilot further comprises an I/O component that permits the microprocessor and memory to communicate with a database, and wherein the microprocessor and memory are further configured to: (5) obtain vehicle characteristics from the database and send vehicle characteristics to the database.

In some embodiments the vehicle response characteristics include steering angle rate: dead zone, linear region or saturated region.

In some embodiments the vehicle response characteristics include steering angle: delay time, rise time, settling time, overshoot or steady-state error.

In some embodiments the microprocessor and memory are further configured to: (4) send vehicle speed commands to a vehicle speed actuator.

In some embodiments the calibration maneuver is completed within a pre-defined geographic area.

Methods described herein include a method for farm vehicle autopilot calibration, tuning and diagnostics, the method comprising: a microprocessor and memory in a farm vehicle autopilot: receiving steering angle data from a steering angle sensor; sending steering angle commands to a steering angle actuator; guiding a farm vehicle through a calibration maneuver and measuring vehicle response characteristics during the calibration maneuver with GNSS and IMU sensors; tuning autopilot settings according to a tuning algorithm; computing a performance grade to summarize calibration and tuning data; reporting vehicle component abnormalities; and, sending vehicle characteristics to, or receiving vehicle characteristics from, a database.

In some embodiments the sending or receiving are performed via a cellular data network.

In some embodiments a method for farm vehicle autopilot calibration further comprises the microprocessor and memory sending vehicle speed commands to a vehicle speed actuator.

In some embodiments the computing a performance grade comprises fuzzy logic operations.

DETAILED DESCRIPTION

Figure 1:
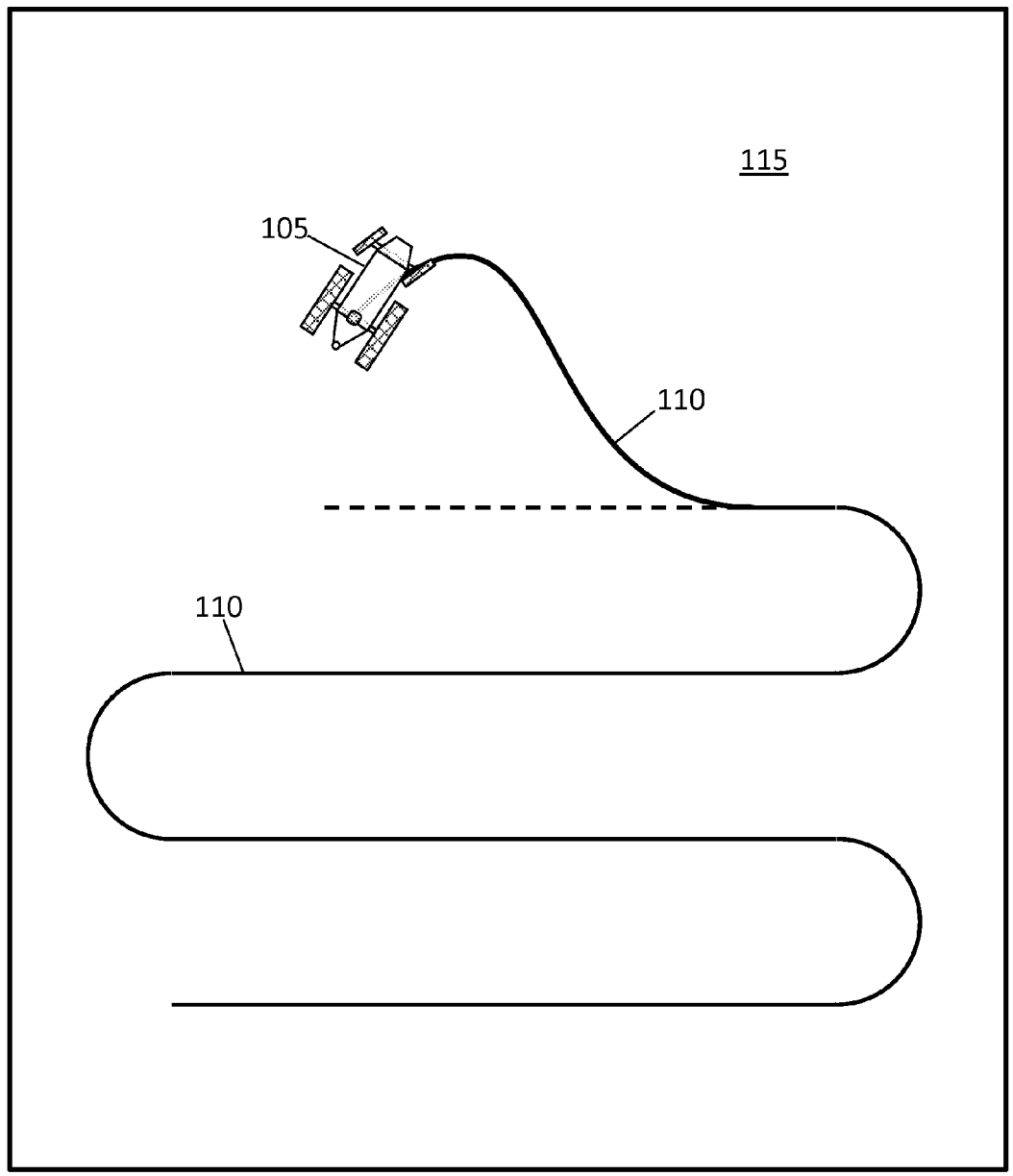
FIG. 1 illustrates an autopilot-controlled tractor operating in a field.

Farm vehicle autopilots save farmers from the tedious and difficult job of precise driving in fields. FIG. 1 illustrates an autopilot-controlled tractor operating in a field, for example. In FIG. 1, tractor 105 follows path 110 in field 115. If one imagines driving day after day along a set of parallel guide lines over a five- or ten-thousand acre farm, it quickly becomes apparent how useful a good autopilot is.

Autopilot performance is composed of many factors; for example: When the autopilot is driving, how accurately does a vehicle follow the path set out for it? Does the vehicle stay within an inch of a desired path or does it tend to wander back and forth across the path? When the vehicle arrives at a line that it is supposed to follow, does it join the line promptly or does it take extra time to settle down?

Figure 2:
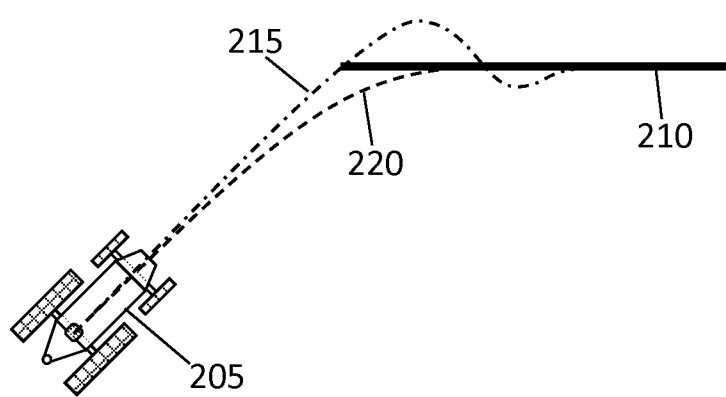
FIG. 2 illustrates an autopilot-controlled tractor approaching a line.

This last consideration is shown in FIG. 2 which illustrates an autopilot-controlled tractor approaching a line. In FIG. 2, tractor approaches line 210. The goal of an autopilot in this situation is to guide the tractor onto the line as quickly and accurately as possible. In FIG. 2, dash-dot curve 215 and dashed curve 220 show possible tracks made by the tractor as it joins the line. Dash-dot curve 215 illustrates overshooting (the tractor initially goes past the desired line) and oscillation (the tractor re-crosses the line after the initial overshoot). Dashed curve 220 illustrates joining the line accurately, but perhaps not as quickly as possible.

Automatic calibration, tuning and diagnostics for farm vehicle autopilots help determine vehicle capabilities, adjust autopilot parameters for each vehicle, and inform operators what level of performance may be expected when a vehicle is operating under autopilot control. Automatic calibration, tuning and diagnostics make it possible for an autopilot to work well with a large variety of vehicles equipped with all kinds of different sensors and actuators.

Automated procedures include maneuvers that are difficult for a human to perform. For example, part of a calibration routine might be to steer a vehicle through a full left turn (maximum steering angle), a straight line segment, and a full right turn. When a person is asked to steer a tractor through this routine they may not turn the steering wheel all the way to its limits, they may steer a degree or two left or right instead of straight, they may steer opposite (e.g. right instead of left) for just a moment before beginning a turn, or they may forget one of the maneuvers. Automatic calibration eliminates these types of errors.

Automated tuning ensures that autopilot parameters are adjusted properly given measured vehicle characteristics obtained during calibration. Many autopilots allow users to adjust any of dozens of autopilot parameters. Sometimes an "aggressiveness" control is provided that, roughly speaking, allows an operator to trade accuracy for smoothness. This type of control allows an autopilot to be tuned in accordance with user preferences. Given the opportunity, however, some users are tempted to adjust more fundamental parameters such as gains, delays and dead zone limits. This can quickly lead to trouble.

As an example, an operator may notice that autopilot steering performance is worse than in the past. Perhaps he notices a tractor wandering where it drove perfectly straight before. Changing an autopilot gain parameter may lead to a temporary improvement, but it will not fix the problem if it turns out there is part of the tractor's steering mechanism that is worn out or broken.

When proper calibration and tuning procedures have been followed, automated diagnostics interpret the results and identify problems. Rather than simply presenting an operator or a technician with a long list of parameter values, automated diagnostics interpret parameter sets and consolidate expected performance in one or more summary grades. For example, after automatic calibration and tuning, automatic diagnostics may report that a particular autopilot installation on a vehicle receives grade "A" indicating that full performance may be expected. If automatic diagnostics report lower grades, they may also indicate possible sources of trouble. Diagnostics might report grade "C" and "dead-zone calibration not performed" if automatic calibration was not able to complete all required steps, for example. Diagnostics may also make recommendations such as "check steering valve" if performance is not what is expected for a particular vehicle type. Diagnostics may run at any time, not only immediately after calibration and tuning, and so can detect and report problems when they occur.

Automatic diagnostics may make use of a database of vehicle and autopilot performance data. Calibration data from vehicle type "X" with steering sensor "Y" and steering actuator "Z" are useful for comparison when autopilot systems are installed on other vehicles of type "X" or vehicles having steering sensor "Y" or steering actuator "Z". Of course, many other kinds of data may be stored in the database such as tire configurations, vehicle intended use, vehicle weight, typical driving conditions (e.g. flat ground vs. steep hills), component ages or time in service, etc.

Figure 3:
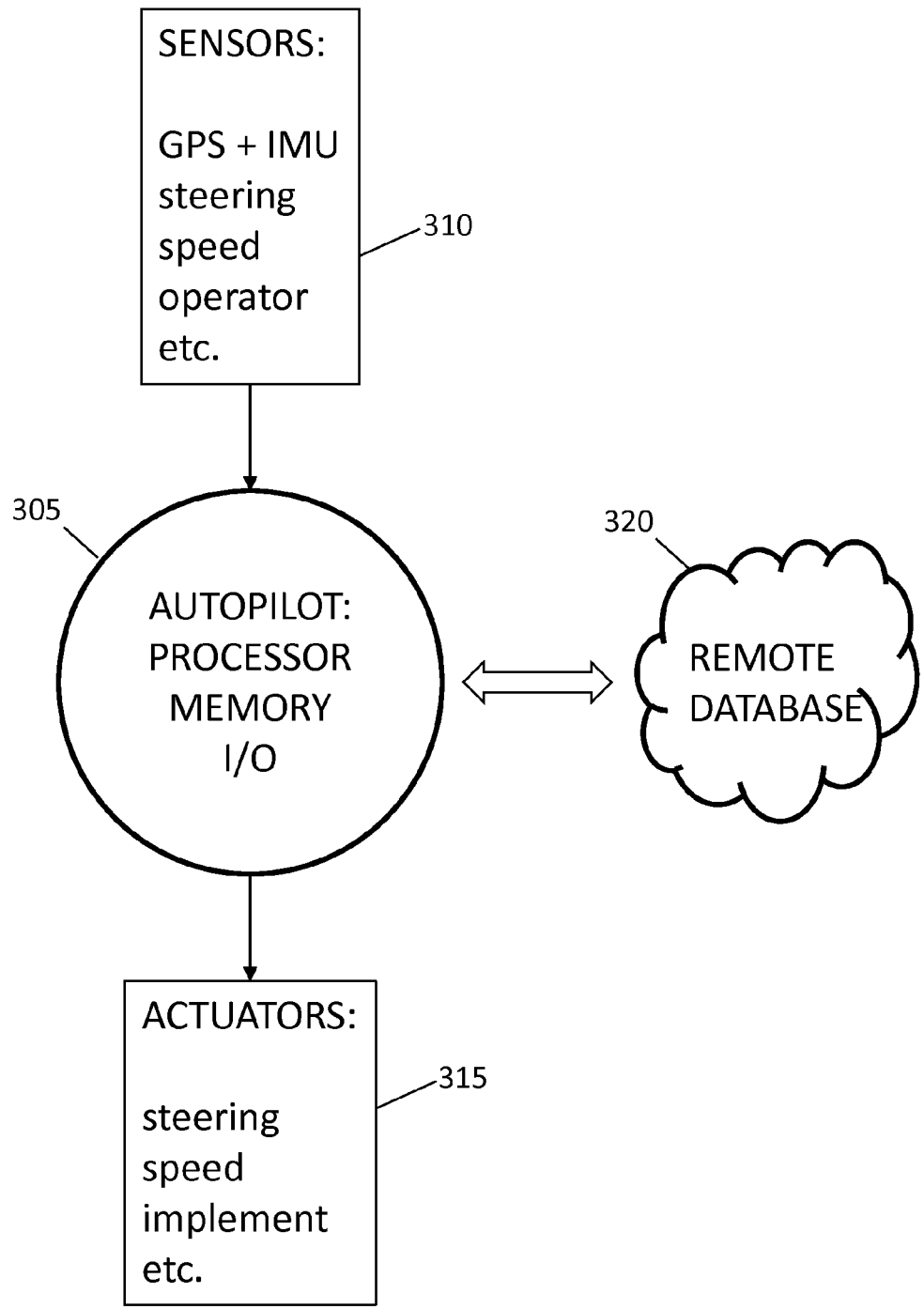
FIG. 3 is a system block diagram for a farm vehicle autopilot.

Automatic calibration, tuning and diagnostics are carried out by an advanced autopilot system. A system block diagram is shown in FIG. 3. In FIG. 3, autopilot 305 receives inputs from sensors 310 and drives a vehicle via actuators 315. Autopilot 305 includes a microprocessor, memory and input/output (I/O) components. I/O may include user display (e.g. LCD display, LED light bar) and input devices (e.g. keyboard, mouse, joystick). I/O components may also include radio data communications capabilities (e.g. via WiFi or cellular data networks) for communicating data to and from remote 320 database.

Sensors 310 may include: GNSS receiver(s) (e.g. GPS, GLONASS, Beidou, etc.), inertial measurement unit(s) that contain accelerometers and/or gyroscopes, magnetometers that measure magnetic heading, steering sensors that measure vehicle steering angle, vehicle and/or engine speed sensors, and other sensors that detect, for example, when an operator has moved a steering wheel, or whether or not an operator is present in a tractor cab. The steering sensors may be based on potentiometers or multiple IMUs mounted on different vehicle components. Actuators 315 may include: steering actuators (e.g. hydraulic valves), speed actuators (e.g. engine speed and/or gear shift), and/or implement actuators.

Some "autopilot-ready" or "drive-by-wire" vehicles, especially advanced tractors, provide a data interface to sensors and actuators. In such cases, an autopilot still includes its own GNSS and IMU, but sends and receives electronic messages to control and sense vehicle steering, speed and implement handling. As an example, an autopilot might issue a vehicle curvature rate command via a CAN (controller area network) bus rather than send a signal directly to a hydraulic steering valve. Calibration, tuning and diagnostics are necessary and performed with both direct control and drive-by-wire vehicles.

Figure 4:
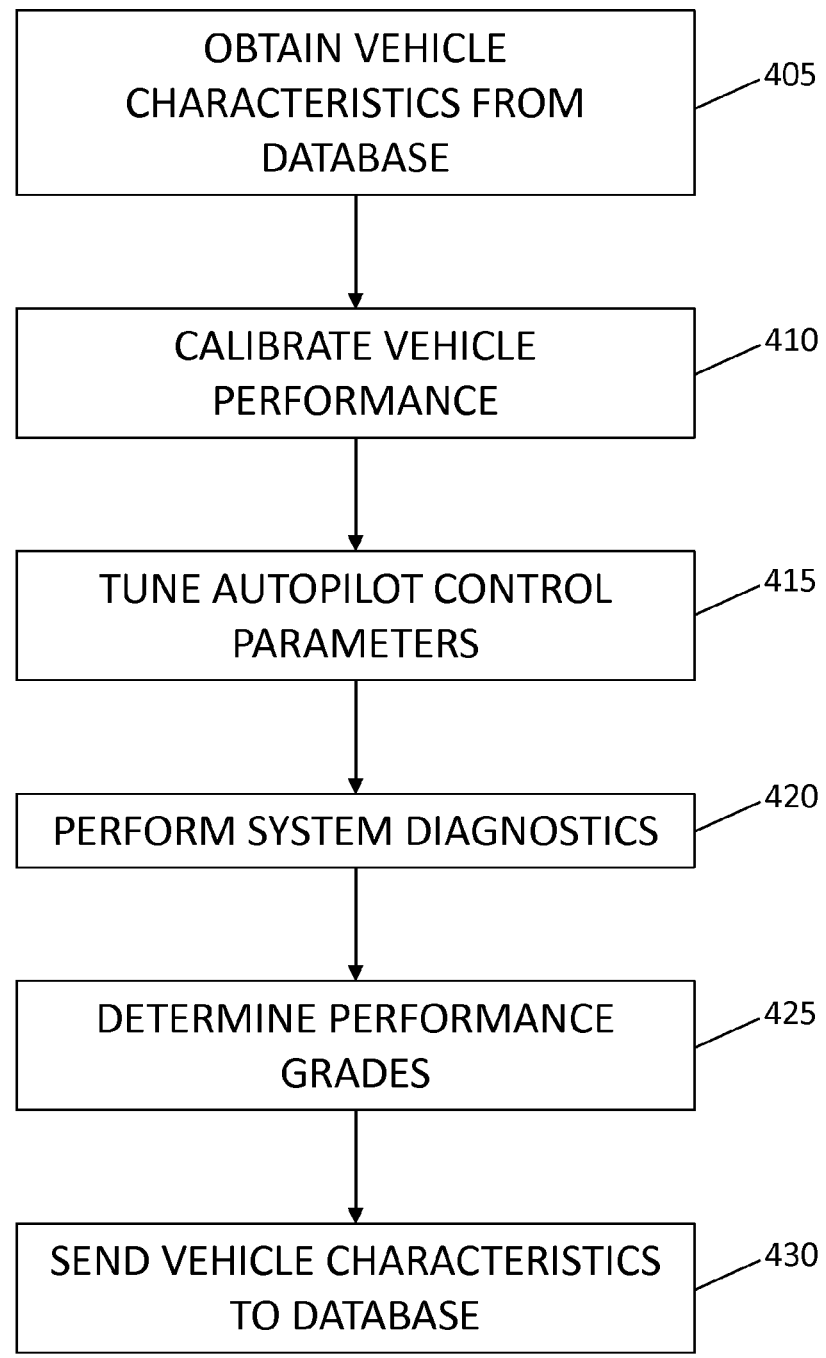
FIG. 4 is a flowchart that outlines a method for autopilot calibration, tuning and diagnostics.

FIG. 4 is a flowchart that outlines a method for autopilot calibration, tuning and diagnostics. The steps in FIG. 4 are: 405—obtain vehicle characteristics from database; 410—calibrate vehicle performance; 415—tune autopilot control parameters; 420—perform system diagnostics; 425—determine performance grades; and, 430—send vehicle characteristics to database. As discussed below, some of the steps in the method of FIG. 4 are optional and the steps need not be performed in the order shown. The method of FIG. 4 is performed by a processor in an autopilot such as autopilot 305.

Steps 405 and 430 encompass receiving data from a database and sending data to a database. The database may be contained in memory associated with autopilot 305 or it may be a remote database like database 320 accessed via I/O capabilities of autopilot 305. Since information from a database is not required for calibration, tuning and diagnostics, steps 405 and 430 are optional. However, a database of vehicle, sensor and actuator characteristics (both as individual components and as complete system installations) is useful for diagnostic purposes because of the large number of vehicle, sensor and actuator permutations. If a database contains entries for a certain vehicle type equipped with certain sensors and actuators, corresponding tuning information can be consulted when setting up an autopilot on another vehicle of the same type with the same type sensors and actuators. When tuning parameters for a new vehicle are significantly different from those in the database for similar vehicles, diagnostics may determine that a problem exists.

Calibration, tuning and diagnostics (steps 410, 415, 420 and 425) are now discussed in greater detail.

Calibration

Calibration means measuring vehicle, sensor and actuator performance characteristics. An example of calibration is determining what steering sensor signal level corresponds to full left steering angle for a particular steering sensor installed on a particular vehicle. Another example is measuring actual vehicle curvature obtained in response to a curvature command issued on a CAN bus.

Calibration measurements are often performed during specific calibration maneuvers such as those illustrated in FIGS. 5A-5D. The maneuvers illustrated in FIGS. 5A and 5B are right and left turns, respectively. The turns may be performed at specific steering angles or the turns may be made with maximum right or maximum left steering angle to determine what the maximum steering angles are. The turns may be performed at specific speeds. The maneuver illustrated in FIG. 5C is steering a straight line and may be used to determine steering sensor output corresponding to zero steering angle.

Autopilot 305 computes position and velocity information from GPS and IMU data provided by sensors 310. This information, combined with knowledge of a specific vehicle configuration (e.g. front steerable, rear steerable, hinged, tracked, articulated, etc.) and dimensions (e.g. wheelbase, track width, etc.) allows the autopilot to calibrate steering angle sensors.

Some of the most difficult maneuvers for a human to perform involve holding constant steering angle, including zero steering angle, i.e. not turning. Collecting GPS and IMU data while a constant steering angle is maintained represents a major part of calibration, and performing these maneuvers automatically leads to a large improvement in the quality of calibration data compared to manual calibration.

The maneuvers in FIGS. 5A-5C may also be performed to calibrate CAN bus curvature commands. The actual curvature achieved by a vehicle in a turn may be compared to the requested curvature. An autopilot may store the correspondence between requested and actual curvatures in a lookup table (e.g. to achieve an actual curvature of +8.5 m, send a CAN bus request for +8.3 m) or as coefficients to a fitting function (e.g. actual curvature=1.024×requested curvature).

FIG. 5D illustrates a maneuver used in roll calibration. A vehicle is parked at a certain point and the vehicle's roll angle (about the longitudinal axis) is measured by an IMU in an autopilot. Next, the vehicle is parked over the same point, but headed in the opposite direction. (FIG. 5D shows the dashed outline of a tractor headed one way and the solid outline of the same tractor headed the opposite direction.) Roll angles measured with the two opposite headings are compared to find out what measured roll angle corresponds to "up" or perpendicular to the horizon.

Figure 6:
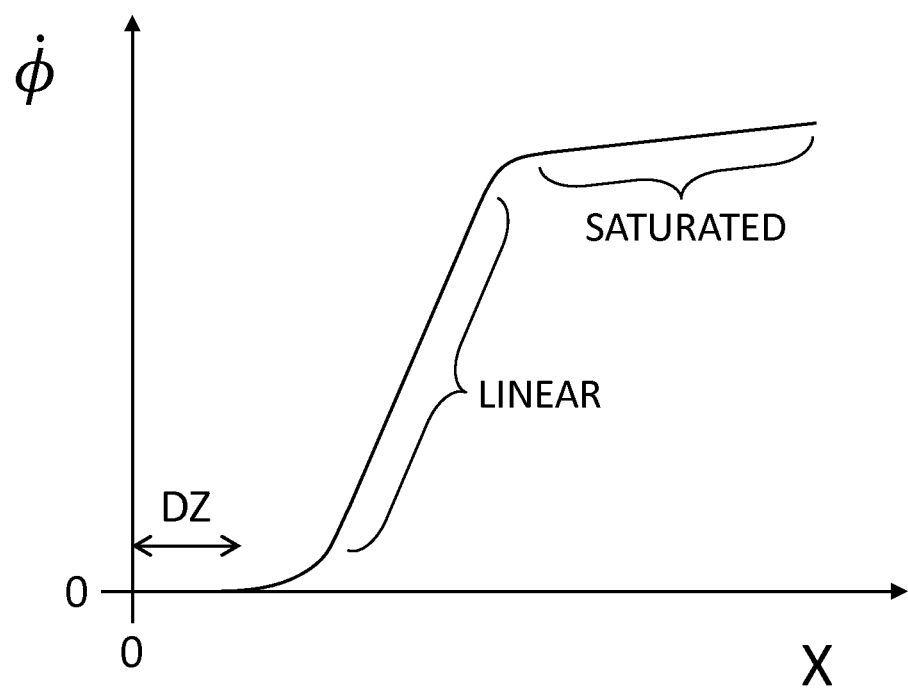
FIG. 6 shows an example actuator response curve.
Figure 7:
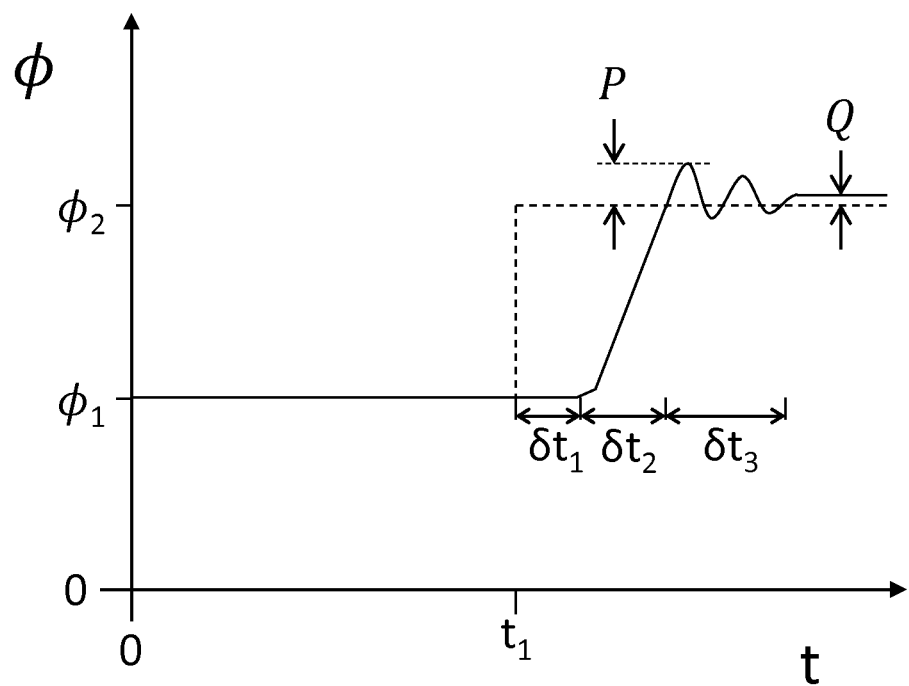
FIG. 7 shows example vehicle response characteristics.

FIGS. 6 and 7 illustrate further calibration measurements. FIG. 6 shows an example actuator response curve. In FIG. 6, steering angle rate, $\Phi$, is plotted as a function of steering valve actuation signal, X. In a typical farm tractor, steering angle is controlled by an electrically actuated hydraulic valve, and the valve actuation signal is a pulse-width modulated electrical signal. Other actuator response characteristics (e.g. curvature rate vs curvature rate command value) have similar form to the curve shown in FIG. 6.

FIG. 6 shows that as valve actuation signal X is increased from zero, initially steering angle rate remains zero. This region of the graph, marked "DZ", is referred to as a dead zone or dead band. As X increases further, the "LINEAR" region of the graph is reached where steering angle rate is proportional to X. Finally, in the "SATURATED" region, further increases in X lead to only small changes in steering angle rate. The shape and dimensions of actuator response curves, such as that of FIG. 6, are parameters that are measured during calibration and used during tuning procedures.

As an example, consider an autopilot guiding a vehicle along a straight line. If the autopilot senses (e.g. via GPS and/or IMU) that the vehicle is turning left, then it must command a small right turn to compensate and keep the vehicle going straight. If the autopilot commands a change in steering angle rate with a value of X that lies in the dead zone, nothing will happen, the steering angle rate will not change. Thus, to perform effectively the autopilot should "know" (i.e. have stored in its memory) what the limits of the dead zone are. These limits are different for different hydraulic valves. Dead zone limits are just one example of a parameter measured during calibration. The slopes and extents of the linear and saturated regions are other examples.

FIG. 7 shows example vehicle response characteristics. In FIG. 7, steering angle, $\Phi$, is plotted versus time, t. From time zero until time, $t_1$, the steering angle is constant, $\Phi_1$. At time, $t_1$, an autopilot commands a change from steering angle, $\Phi_1$, to steering angle, $\Phi_2$. (The steering angle commanded by the autopilot is graphed as a dashed line; the actual steering angle achieved is graphed as a solid line.) The autopilot may effect a steering angle change in various ways, e.g. by changing steering angle rate via X (see FIG. 6) or issuing a curvature command via a CAN bus. Despite the autopilot requesting a steering angle change at $t_1$, nothing happens during time $\delta t_1$. The steering angle finally does change during time $\delta t_2$, but it overshoots $\Phi_2$ and takes time $\delta t_3$ to settle down. The maximum amount of overshoot is labeled "P". After the steering angle settles down, it is still not exactly right; the steady-state error is labeled "Q". Times $\delta t_1$, $\delta t_2$, and $\delta t_3$ are referred to as delay time, rise time and settling time, respectively. Along with P and Q, they represent five parameters measured during autopilot calibration.

Calibration may involve measurement of many other vehicle performance characteristics as well. Examples include response to vehicle speed commands or implement maneuvers. In each case an autopilot may control an actuator directly or it may send requests via a vehicle's drive-by-wire system.

Figure 5:
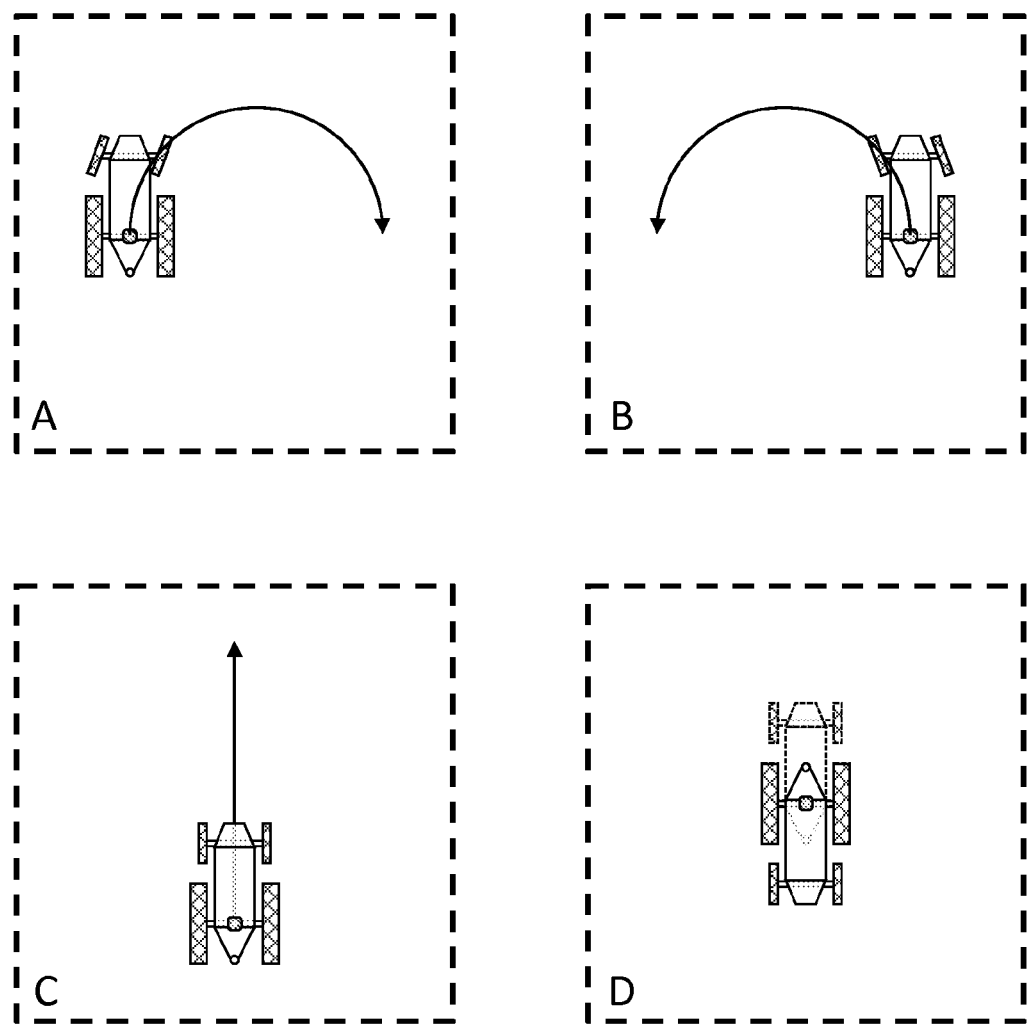
FIG. 5A illustrates a calibration maneuver.
FIG. 5B illustrates a calibration maneuver.
FIG. 5C illustrates a calibration maneuver.
FIG. 5D illustrates a calibration maneuver.

During automatic calibration an autopilot guides a vehicle through a sequence of maneuvers, like those of FIG. 5 and others, and collects sensor measurements to characterize vehicle performance. A calibration routine, programmed in an autopilot, may be restricted to take place only within a pre-defined area. The coordinates and dimensions of a flat area of ground may be entered in an autopilot to keep all calibration maneuvers within a bounding box, for example.

Automatic calibration produces accurate data for autopilot tuning. In some cases, these data cannot be reliably obtained with manual procedures. It is very difficult for a person to steer a vehicle accurately enough to generate high quality data from a series of steering angle tests possibly performed at different speeds. Vehicle guidance under autopilot control is more accurate than when a person is driving; similarly automatic calibration yields better results than manual calibration.

Tuning

Tuning means adjusting autopilot settings in response to vehicle characteristics measured during calibration. Examples of tuning include adjusting proportional and differential gains in a servo loop to get best steering response for a desired change in steering angle, or adjusting parameters sent with CAN commands to achieve a desired vehicle behavior.

Just as there may be a large number of calibration measurements, there also may be a large number of tuning adjustments. Tuning may involve setting appropriate gains and delays, gain scheduling to account for nonlinearities, taking into account measured dead zones, etc. In general, given a set of calibration data, those skilled in the art know how to tune an autopilot control system and such tuning may be performed automatically by an autopilot's microprocessor through the execution of tuning algorithms stored in an autopilot's memory.

Automatic tuning is preferred over manual tuning because a tuning algorithm is capable of combining information from many different calibration measurements to obtain an overall best autopilot set-up. Automatic tuning reduces the temptation an operator may have to manually adjust a tuning parameter which usually results in unintended consequences. Tuning is often an iterative process, and while a human may be successful at tuning one parameter based on results of several calibration maneuvers, when many parameters are involved, as is typically the case, a microprocessor algorithm is far more likely to find an overall optimum tuning set up.

Diagnostics

Diagnostics means summarizing the set-up of an autopilot installation and reporting problems. Automatic diagnostics let dealers, installers, and operators know immediately what level of performance may be expected from a particular autopilot installation. Diagnostics also help identify the cause of poor autopilot performance, should it occur.

When a farmer has a new autopilot installed on a tractor, sprayer or combine harvester, he needs to know how well the autopilot and vehicle will perform. If he is expecting 1-inch path following accuracy, he needs to know right away if there is anything standing in the way of that goal. Calibration produces a long list of measurements and tuning generates a similarly long list of tuning parameter adjustments, but these data are not easy for humans to interpret. Even an expert cannot quickly identify potential installation problems from a set of calibration and tuning data.

Automatic diagnostics solve this problem by applying rules, quality criteria or fuzzy logic to summarize calibration and tuning data. Diagnostics can reduce calibration and tuning results into a small set of letter grades (sometimes just one) that reflect overall system performance.

Automatic diagnostics may also monitor system performance at any time, not just immediately after calibration and tuning. When a problem is detected, diagnostics can help operators find its cause. For example, instead of merely reporting an unusual value for a valve dead zone (information that could be easily overlooked in a large set of calibration data), an autopilot with automatic diagnostics can alert an operator with a "SUSPECT BAD STEERING VALVE" message. Reporting vehicle component abnormalities helps solve steering problems much faster than is possible with conventional autopilot systems.

Automatic diagnostics are enhanced when access to a database of vehicle, sensor and actuator performance data is available. Given vehicle configuration (e.g. front steer, articulated, differential drive, etc.) or specific type (make and model), sensor type and/or actuator type, diagnostics can compare calibration data to that obtained from similar autopilot installations. Calibration data collected from each installation may also be recorded in the database as a reference for future installations. I/O components of an autopilot enable its microprocessor and memory to obtain vehicle characteristics from a database and send vehicle characteristics to the database.

Figure 8:
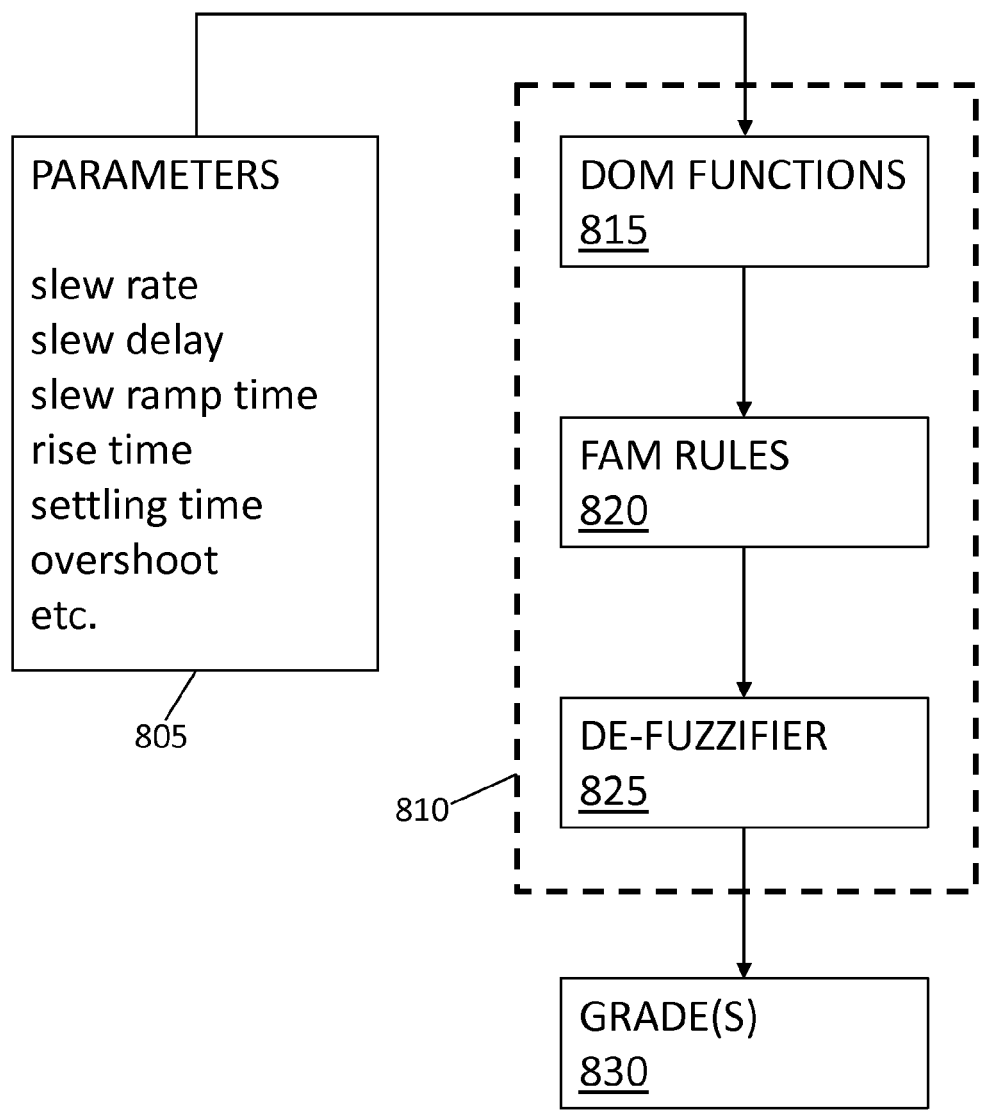
FIG. 8 shows a first autopilot performance grading system.

A fuzzy logic system provides one way of implementing automatic diagnostics as illustrated in FIG. 8 which shows a first autopilot performance grading system. In FIG. 8, parameters 805 are inputs to fuzzy reasoner 810. Reasoner 810 includes degree-of-membership (DOM) functions 815, fuzzy associative memory (FAM) rules 820, and de-fuzzifier 825. The output of the fuzzy reasoner is grade(s) 830. The system of FIG. 8 is implemented in a microprocessor and memory of an autopilot; the grade may be presented to a user via the autopilot's I/O facilities.

Parameters 805 may include measurements such as: maximum steering angle rate, steering angle delay, rise times, settling times, overshoot parameters, actuator response slopes, actuator response linearity and saturation characteristics, etc. Degree of membership functions 815 map crisp inputs to membership in sets. For example, a maximum steering angle slew rate of 20 degrees per second might have a 0.8 membership in a SLOW set, 0.2 membership in a MEDIUM set, and 0.0 membership in a FAST set. However, a maximum steering angle slew rate of 40 degrees per second might have 0.0 membership in the SLOW set, 0.05 membership in the MEDIUM set, and 0.95 membership in the FAST set.

Fuzzy associative memory rules 820 are evaluated to determine output degree of membership set values. De-fuzzifier 825 converts the output degree of membership set values to crisp outputs such as grades. Suppose, as an example, that a fuzzy reasoner only has two inputs, steering angle rate and steering angle settling time. (In a real system, a fuzzy reasoner has several inputs.) In this case FAM rules and de-fuzzifier might specify that if steering angle rate is FAST and steering angle settling time is SHORT, then output grade 830 is "A". And if steering angle rate is MEDIUM and steering angle settling time is SHORT, then output grade 830 is "B".

The FAM rules are initially determined by autopilot design engineers and then fine-tuned based on field data. Alternatively, the DOM functions and FAM rules may be automatically learned over time using a genetic algorithm. The de-fuzzifier may use the singleton method or the centroid method of determining crisp outputs, as examples.

Grade(s) 830 is one of the results of automatic diagnostics. In many cases a single letter or numerical grade is sufficient. For example, a particular autopilot installation might receive a grade of "81" or "B–". More than one grade may be given when different aspects of system performance are important to different operators. Different grades may be given for speed and accuracy, for example, and operators that value one of those attributes more than the other may choose tuning options to achieve the behavior that they want.

The diagnostic system of FIG. 8 is most commonly implemented in autopilot firmware; i.e. in the processor and memory of FIG. 3. However, it may also be implemented in a remote server with which an autopilot communicates via its I/O capabilities. Thus an operator may execute calibration and tuning procedures with a vehicle autopilot, but receive diagnostic data on his cell phone or tablet.

Figure 9:
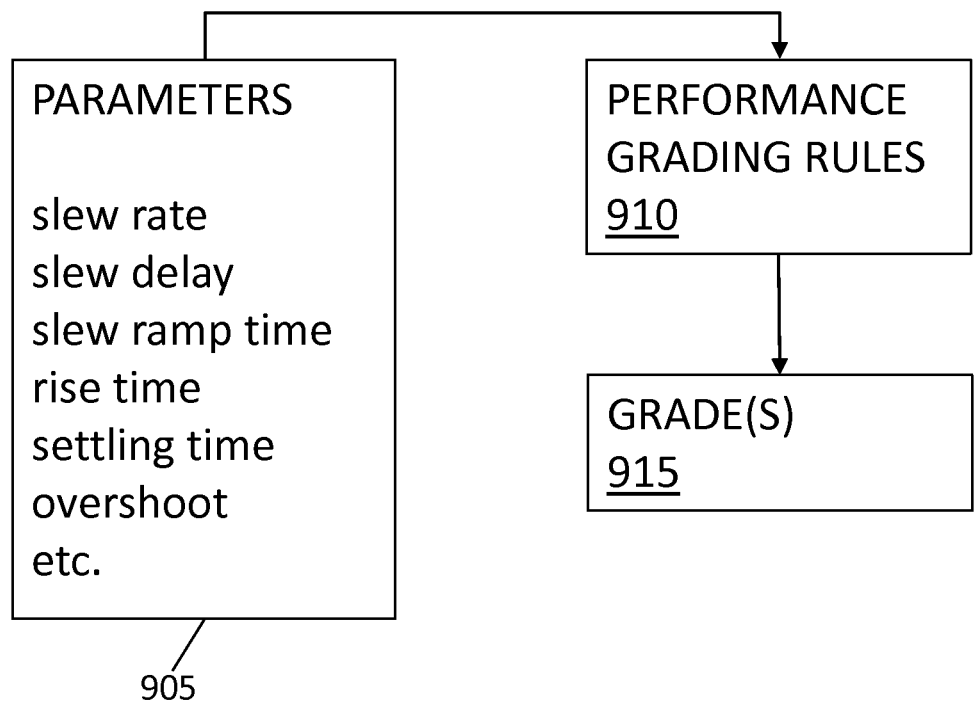
FIG. 9 shows a second autopilot performance grading system.

Automatic diagnostics may also be implemented without fuzzy logic as illustrated in FIG. 9 which shows a second autopilot performance grading system. In FIG. 9, parameters 905, which are the same as parameters 805 in FIG. 8, are inputs for performance grading rules 910. The output of the rules is grade(s) 915. The system of FIG. 9 is the same as that of FIG. 8 with the exception that grading rules 910 are not implemented with fuzzy logic as in fuzzy reasoner 810. Instead, grading rules 910 may include functions of the inputs, such as weighted sums of vehicle characteristic data, or decision trees (e.g. "if . . . then . . . ").

The system of FIG. 9 may jump to a grade if a minimum performance value for one or more parameters is not met. For example, one of grading rules 910 may be that slew rate must be at least 10 degrees per second, and if the slew rate is less than that, the entire system is graded "F" regardless of other parameter values. A system may also be graded "F" if certain calibration routines have never been run and therefore corresponding performance data are missing.

Automated calibration, tuning and diagnostics improve precision farming by helping farmers obtain best performance from their autopilot-guided vehicles. Calibration and tuning are most important when a new system is installed on a vehicle or when sensors or actuators are changed. Diagnostics evaluate system performance and alert operators to performance changes. Diagnostics may be performed any time and in some cases may be performed at all times that an autopilot is running.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A farm vehicle autopilot comprising:
a global navigational satellite system (GNSS) sensor and an inertial measurement unit (IMU) sensor in communication with a microprocessor and memory, wherein the microprocessor and memory are configured to: (1) receive steering angle data from a steering angle sensor, (2) send steering angle commands to a steering angle actuator, and (3) perform automatic autopilot calibration by guiding a farm vehicle through a calibration maneuver and measuring vehicle response characteristics during the calibration maneuver with the GNSS and IMU sensors.

2. The farm vehicle autopilot of claim 1 wherein the microprocessor and memory are further configured to: (4) perform automatic tuning of autopilot settings.

3. The farm vehicle autopilot of claim 1 wherein the microprocessor and memory are further configured to: (4) perform automatic diagnostics of vehicle performance under autopilot control.

4. The farm vehicle autopilot of claim 3 wherein the automatic diagnostics include computing a performance grade to summarize calibration and/or tuning data.

5. The farm vehicle autopilot of claim 3 wherein the automatic diagnostics include reporting vehicle component abnormalities.

6. The farm vehicle autopilot of claim 3 wherein the automatic diagnostics are based on a fuzzy logic reasoner comprising degree-of-membership functions and fuzzy associative memory rules.

7. The farm vehicle autopilot of claim 3 wherein the automatic diagnostics are based on performance grading rules including weighted sums of vehicle characteristic data.

8. The farm vehicle autopilot of claim 3 further comprising an I/O component that permits the microprocessor and memory to communicate with a database, and wherein the microprocessor and memory are further configured to: (5) obtain vehicle characteristics from the database and send vehicle characteristics to the database.

9. The farm vehicle autopilot of claim 1 wherein the vehicle response characteristics include steering angle rate: dead zone, linear region or saturated region.

10. The farm vehicle autopilot of claim 1 wherein the vehicle response characteristics include steering angle: delay time, rise time, settling time, overshoot or steady-state error.

11. The farm vehicle autopilot of claim 1 wherein the microprocessor and memory are further configured to: (4) send vehicle speed commands to a vehicle speed actuator.

12. The farm vehicle autopilot of claim 1 wherein the calibration maneuver is completed within a pre-defined geographic area.

13. A method for farm vehicle autopilot calibration, tuning and diagnostics, the method comprising:
a microprocessor and memory in a farm vehicle autopilot:
receiving steering angle data from a steering angle sensor;
sending steering angle commands to a steering angle actuator;
guiding a farm vehicle through a calibration maneuver and measuring vehicle response characteristics during the calibration maneuver with GNSS and IMU sensors;
tuning autopilot settings according to a tuning algorithm;
computing a performance grade to summarize calibration and tuning data;

reporting vehicle component abnormalities; and,
sending vehicle characteristics to, or receiving vehicle characteristics from, a database.

14. The method of claim 13, the sending or receiving performed via a cellular data network.

15. The method of claim 13 further comprising the microprocessor and memory sending vehicle speed commands to a vehicle speed actuator.

16. The method of claim 13, the computing a performance grade comprising fuzzy logic operations.

* * * * *